(12) United States Patent
Hwang

(10) Patent No.: US 7,570,340 B2
(45) Date of Patent: Aug. 4, 2009

(54) TRANSFLECTIVE LCD DEVICE AND FABRICATION METHOD THEREOF

(75) Inventor: Han-Wook Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 347 days.

(21) Appl. No.: 11/404,855

(22) Filed: Apr. 17, 2006

(65) Prior Publication Data

US 2006/0187391 A1    Aug. 24, 2006

Related U.S. Application Data

(62) Division of application No. 10/811,981, filed on Mar. 30, 2004, now Pat. No. 7,053,974.

(30) Foreign Application Priority Data

Apr. 4, 2003    (KR) .......................... 2003-0021390

(51) Int. Cl.
*G02F 1/1339* (2006.01)
*G02F 1/1335* (2006.01)
(52) U.S. Cl. .................. 349/156; 349/114; 349/106
(58) Field of Classification Search ......... 349/155–156, 349/187, 114, 106–109
See application file for complete search history.

(56) References Cited

U.S. PATENT DOCUMENTS 6,215,538 B1    4/2001    Narutaki et al.
6,310,672 B1    10/2001   Koike et al.
6,323,921 B1    11/2001   Kurauchi et al.
6,620,655 B2 *  9/2003    Ha et al. ............... 438/149
7,053,974 B2 *  5/2006    Hwang ................. 349/155
7,126,662 B2 * 10/2006    Choi et al. ............ 349/155

FOREIGN PATENT DOCUMENTS

KR    2001-0084736    9/2001
KR    2002-0032854    5/2002

* cited by examiner

*Primary Examiner*—Dung T. Nguyen
(74) *Attorney, Agent, or Firm*—McKenna Long & Aldridge LLP

(57) ABSTRACT

A transflective liquid crystal display device including: first and second transparent substrates facing each other with a reflective portion and a transmissive portion; gate and data lines over the first transparent substrate perpendicularly crossing each other and defining pixel regions; a thin film transistor connected to the gate and data lines in the pixel region; an insulator in the thin film transistor on the first substrate covering the gate line; a passivation layer in the reflection portion on the insulator and on the thin film transistor; a pixel electrode in the reflective and transmissive portions, wherein the pixel electrode contacts both the passivation layer in the reflective potion and the insulator in the transmissive portion; a reflector on the pixel electrode in the reflective portion; color filters on a rear surface of the second transparent substrate, the color filters having through holes; column spacers formed between the reflector and the color filters, each column spacer corresponding in position to each through hole; a common electrode under the color filters; and a liquid crystal layer interposed between the common electrode and the pixel electrode.

3 Claims, 11 Drawing Sheets

TRANSFLECTIVE LCD DEVICE AND FABRICATION METHOD THEREOF

This application is a divisional of U.S. patent application Ser. No. 10/811,981, filed Mar. 30, 2004 now U.S. Pat. No. 7,053,974, which claims the benefit of Korean Patent Application No. 2003-0021390, filed in Korea on Apr. 4, 2003, which is hereby incorporated by reference for all purposes as if fully set forth herein.

BACKGROUND OF THE INVENTION

1. Field of the Invention

The present invention relates to a liquid crystal display device and a method of fabricating a liquid crystal display device, and more particularly, to a transflective liquid crystal display device having through holes in color filters and a method of fabricating the same.

2. Description of Related Art

As the use of information technology increases, the need for flat panel displays with thin profiles, light weight, and lower power consumption has increased. Accordingly, various flat panel display (FPD) devices, such as liquid crystal display (LCD) devices, plasma display panel (PDP) devices, field emission display devices, and electro-luminescence display (ELD) devices, have been developed.

Presently, liquid crystal display (LCD) devices with light weight, thin profiles, and low power consumption are commonly used in office automation equipment and video units. LCD devices typically use a liquid crystal (LC) interposed between upper and lower substrates and make use of optical anisotropy of the LC. Because molecules of the LC are thin and long, an alignment direction of the LC molecules may be controlled by the application of an electric field to the LC molecules. When the alignment direction of the LC molecules is properly adjusted, the LC may be aligned such that light is refracted along the alignment direction of the LC molecules to display images.

In general, LCD devices are divided into transmissive-type LCD devices and reflective-type LCD devices according to whether the display device uses an internal or external light source. The transmissive-type LCD device includes an LCD panel and a backlight device, wherein the incident light produced by the backlight device is attenuated during transmission so that the actual transmittance is only about 7%. As a result, the transmissive-type LCD device requires a relatively high initial brightness, whereby the electrical power consumption required by the backlight device increases. Accordingly, a relatively heavy battery, which cannot be used for an extended period of time, is needed to supply sufficient power to the backlight device.

The reflective-type LCD has been developed, which overcomes these problems. Because the reflective-type LCD device uses ambient light instead of a backlight device and a reflective opaque material is used as a pixel electrode, the reflection-type LCD device is light and easy to carry. In addition, because the power consumption of the reflective-type LCD device is reduced, it may be used in a personal digital assistant (PDA). However, the reflective-type LCD device is easily affected by its surroundings. For example, because ambient light in an office differs largely from that outdoors, the reflective-type LCD device can not be used where the ambient light is weak or does not exist. In order to overcome the problems described above, a transflective-type LCD device has been developed, wherein the device has both a transmissive mode and a reflective mode.

FIG. 1 is a cross-sectional view illustrating a transflective liquid crystal display device according to the related art.

The transflective liquid crystal display device according to the related art includes an array substrate 10, a color filter substrate 50, and a liquid crystal layer 80 interposed between the array and color filter substrates 10 and 50. The color filter substrate 50 includes a black matrix 53 on a rear surface of a transparent substrate 51. Red (R), green (G) and blue (B) color filters 55a, 55b and 55c are also formed on the rear surface of the transparent substrate 51 while covering the black matrix 53. An overcoat layer 63 is formed on a rear surface of the red (R), green (G) and blue (B) color filters 55a, 55b and 55c. The overcoat layer 63 protects the color filters 55a, 55b and 55c. Additionally, a common electrode 65 is formed on a rear surface of the overcoat layer 63.

The array substrate 10 includes a thin film transistor T including a gate electrode 15, a semiconductor layer 20, a source electrode 23 and a drain electrode 25 on a transparent substrate 11 where a gate line (not shown) and a data line 21 cross. A gate insulating layer 17 is interposed between the gate electrode 15 and the semiconductor layer 20 and contacts the transparent substrate 11. A passivation layer 30 is formed on the gate insulating layer 17, covers the thin film transistor T, and has a drain contact hole 35 exposing a portion of the drain electrode 25. A pixel electrode 40 is formed on the passivation layer 30 and contacts the drain electrode 25 through the drain contact hole 35. A reflector 45 is formed on peripheral portions of the pixel electrode 40. In the array substrate, an area where the reflector 45 is formed becomes a reflective portion RA, and an area where the reflector 45 is not formed becomes a transmissive area TA.

Column spacers 70, which are interposed between the array and color filter substrates 10 and 50, form a cell gap where the liquid crystal layer is interposed. Each column spacer 70 corresponds in position to the black matrix 53 of the color filter substrate 50.

The transflective liquid crystal display device having the structure of FIG. 1 has a disadvantage due to the difference in the light efficiency between reflective mode and transmissive mode operation. Thus, the aforementioned liquid crystal display device produces unstable brightness and color reproduction, which are different between the reflective mode and the transmissive mode.

When the transflective liquid crystal display device operates in a transmissive mode, a backlight (not shown) disposed underneath the array substrate 10 generates light directed toward the array substrate 10 such that the light from the backlight passes only once through the color filters 55a, 55b and 55c. However, when the transflective liquid crystal display device operates in a reflective mode, ambient light incident from the surroundings passes through the color filters 55a, 55b and 55c, and then is reflected by the reflector 45 back towards the color filters 55a, 55b and 55c. Therefore, the ambient light passes twice through the color filters 55a, 55b and 55c. This two-time passage through the color filters 55a, 55b and 55c results in the reflective mode reproducing better color than the transmissive mode. However, the two-time passage decreases the brightness in the reflective mode versus the transmissive mode.

To overcome those problems, it has been suggested that the liquid crystal layer between the array and color filter substrates have two different cell gaps and/or that each color filter is formed to have a different thickness between the reflective portion and the transmissive portion. Thus, the color reproduction and the brightness are adjusted to be the same regardless of whether the transflective liquid crystal display device is operated in the reflective mode or in the transmissive mode. However, these modifications also have some disadvantages.

Today when a transflective liquid crystal display device is utilized in mobile phones or PDAs, the image quality becomes an important issue in satisfying buyer's demands. For good image quality, a high resolution is required in the transflective liquid crystal display device. Thus, the transflective liquid crystal display device needs to have many pixels per unit area such that individual pixels are smaller as compared to the pixels in a conventional liquid crystal display device. However, if the pixel size for the transflective liquid crystal display device is reduced, the reflective portion in the transflective liquid crystal display device is also reduced and a decrease in brightness results.

SUMMARY OF THE INVENTION

Accordingly, the present invention is directed to a transflective liquid crystal display device and method of fabricating the same that substantially obviates one or more of the problems due to limitations and disadvantages of the related art.

An advantage of the present invention is to provide a transflective liquid crystal display device to produce uniform color purity and uniform color reproduction.

Another advantage of the present invention is to provide a method of fabricating a transflective liquid crystal display device to produce uniform color purity and uniform color reproduction.

Another advantage of the present invention is to provide a transflective liquid crystal display device and a method of fabricating the same, which produce uniform and stable brightness.

Another advantage of the present invention is to provide a transflective liquid crystal display device and a method of fabricating the same having high transmittance and color purity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective LCD device including: first and second transparent substrates facing each other with a reflective portion and a transmissive portion; gate and data lines over the first transparent substrate perpendicularly crossing each other and defining pixel regions; a thin film transistor connected to the gate and data lines in the pixel region; an insulator in the thin film transistor on the first substrate covering the gate line; a passivation layer in the reflection portion on the insulator and on the thin film transistor; a pixel electrode in the reflective and transmissive portions, wherein the pixel electrode contacts both the passivation layer in the reflective potion and the insulator in the transmissive portion; a reflector on the pixel electrode in the reflective portion; color filters on a rear surface of the second transparent substrate, the color filters having through holes; column spacers formed between the reflector and the color filters, each column spacer corresponding in position to each through hole; a common electrode under the color filters; and a liquid crystal layer interposed between the common electrode and the pixel electrode.

In another aspect, a transflective LCD device, including: first and second transparent substrates facing each other with a reflective portion and a transmissive portion; gate and data lines over the first transparent substrate perpendicularly crossing each other and defining pixel regions; a thin film transistor connected the gate and data lines near in the pixel region; an insulator in the thin film transistor on the first substrate with covering the gate line; a passivation layer in the reflective portion on the insulator and on the thin film transistor; a pixel electrode in the reflective and transmissive portions, wherein the pixel electrode contacts both the passivation layer in the reflective potion and the insulator in the transmissive portion; a reflector on the pixel electrode within the reflective portion; red, green and blue color filters on a rear surface of the second transparent substrate, the red, green and blue color filters corresponding to pixel regions, wherein some of the red, green and blue color filters have through holes and some do not have through holes; column spacers formed between the reflector and the color filters, each column spacer corresponding in position to a color filter that does not have a through hole; a common electrode under the color filters; and a liquid crystal layer interposed between the common electrode and the pixel electrode.

In another aspect, a method of forming a color filter substrate for use in a transflective liquid crystal display device, including: forming a color resin on a transparent substrate having reflective and transmissive potions; disposing a mask over the color resin; irradiating light to the color resin through the mask; forming color filters having through holes; forming an overcoat layer over the transparent substrate to cover the color filters; forming column spacers on the overcoat layer, wherein each column spacer corresponds in position to the through hole; and forming a transparent pixel electrode on the overcoat layer exposed between the column spacers.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain principles of the invention. In the drawings.

DETAILED DESCRIPTION OF ILLUSTRATED EMBODIMENTS

Reference will now be made in detail to embodiments of the present invention, examples of which are illustrated in the accompanying drawings.

Figure 2:
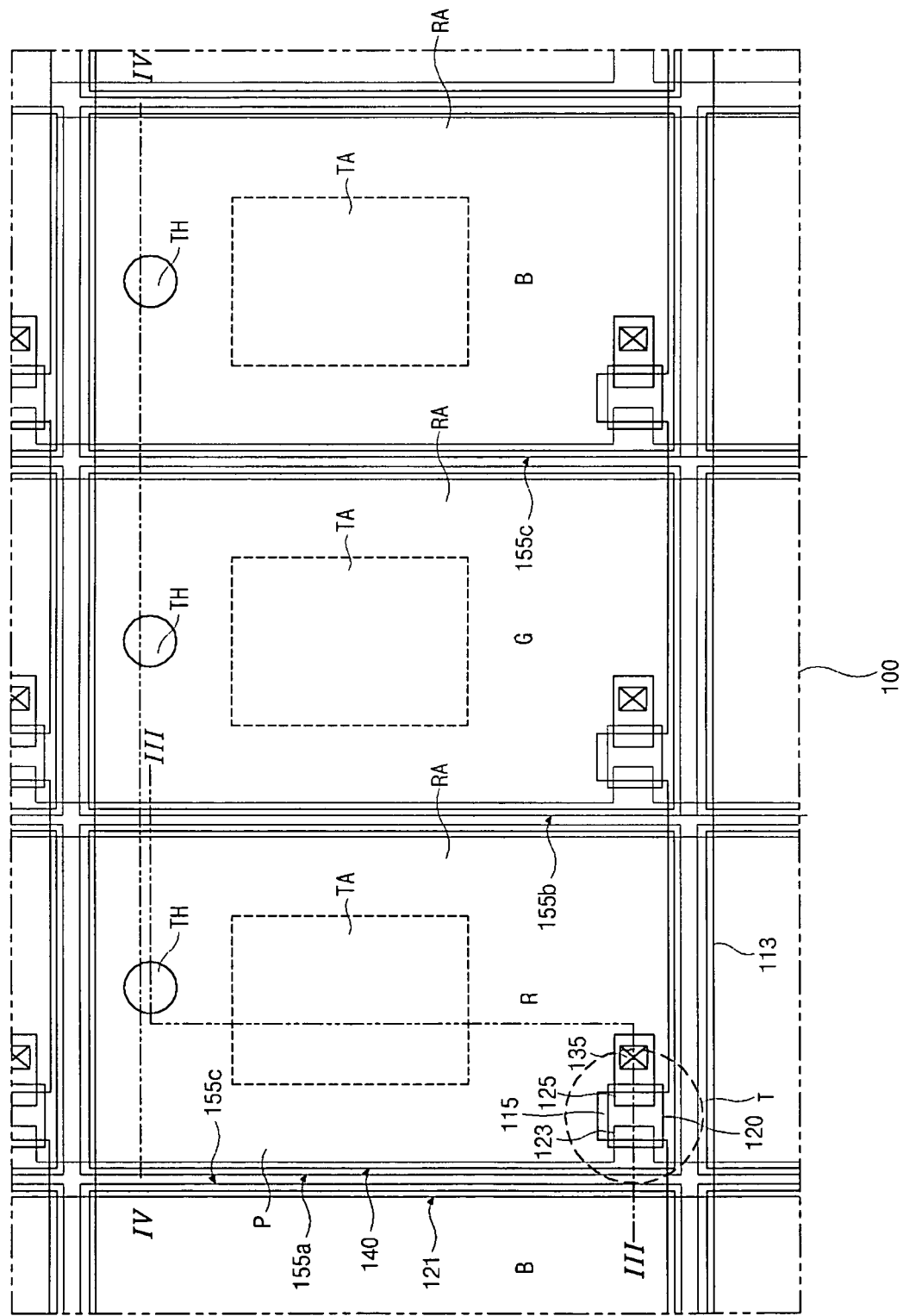
FIG. 2 is a plan view illustrating a transflective liquid crystal display device having a high resolution according to a first embodiment of the present invention.

FIG. 2 is a plan view illustrating a transflective liquid crystal display device having a high resolution according to a first embodiment of the present invention.

In FIG. 2, gate lines 113 are formed transversely on a first transparent substrate and a gate electrode 115 protrudes from the respective gate line 113. The gate lines and electrodes 113 and 115 may be formed of a metallic material. Data lines 121 cross the gate lines 113 and are substantially perpendicular to the gate lines 113. Also, a source electrode 123 extends from the source line 121 over one end portion of the gate electrode 115. Pairs of the gate and data lines 113 and 121 define pixel regions P. A drain electrode 135 is spaced apart from and faces the source electrode 123 across the gate electrode 115. The drain electrode 135 also overlaps the other end portion of the gate electrode 115. The gate electrode 115 and the source and drain electrodes 123 and 125 constitute a thin film transistor T with a semiconductor layer 120 that is interposed between the gate electrode 115 and the source and drain electrodes 123 and 125. As shown in FIG. 2, the thin film transistor T is located near a crossing of the gate and data lines 113 and 121.

In each pixel region P, a pixel electrode 140 is disposed contacting the drain electrode 135 through a drain contact hole 135. The pixel electrode 140 is formed of a transparent conductive material, such as indium-tin-oxide (ITO), and overlaps edge potions of the gate and data lines 113 and 121. The pixel region P is divided into a reflective area RA and a transmissive area TA. The reflective area RA includes the reflector, while the transmissive area TA does not include the reflector. Like the pixel electrode 140, the reflector overlaps the edge portions of the gate and data lines 113 and 121. Moreover, the reflector functions to reflect ambient light incident from outside the display device such that the reflector makes the transflective liquid crystal layer operate in a reflective mode. The reflector may be a metallic material selected from a group including aluminum (Al), aluminum alloy (e.g., AlNd), titanium (Ti), copper (Cu), molybdenum (Mo) etc.

Figure 1:
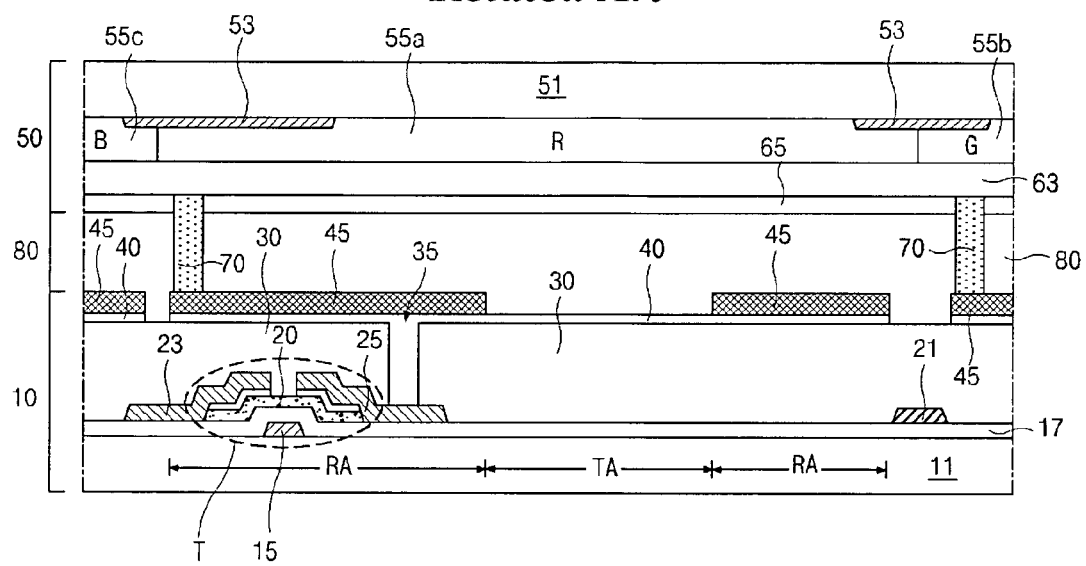
FIG. 1 is a cross sectional view illustrating a transflective liquid crystal display device according to a related art.

Color filter patterns 155a, 155b and 155c having red (R), green (G) and blue (B) colors are formed on a second transparent substrate that faces the first transparent substrate. Each of the color filter patterns 155a, 155b and 155c faces and corresponds to a pixel region P, and overlaps edge portions of the gate and data lines 113 and 121 like the pixel electrode 140. Each color filter pattern 155a, 155b or 155c has a through hole TH in a portion corresponding to the reflective area RA. Unlike the related art shown in FIG. 1, the transflective liquid crystal display device does not include a black matrix among the color filter patterns 155a, 155b and 155c. Although not shown in FIG. 2, a column spacer is disposed in each through hole TH.

Figure 3:
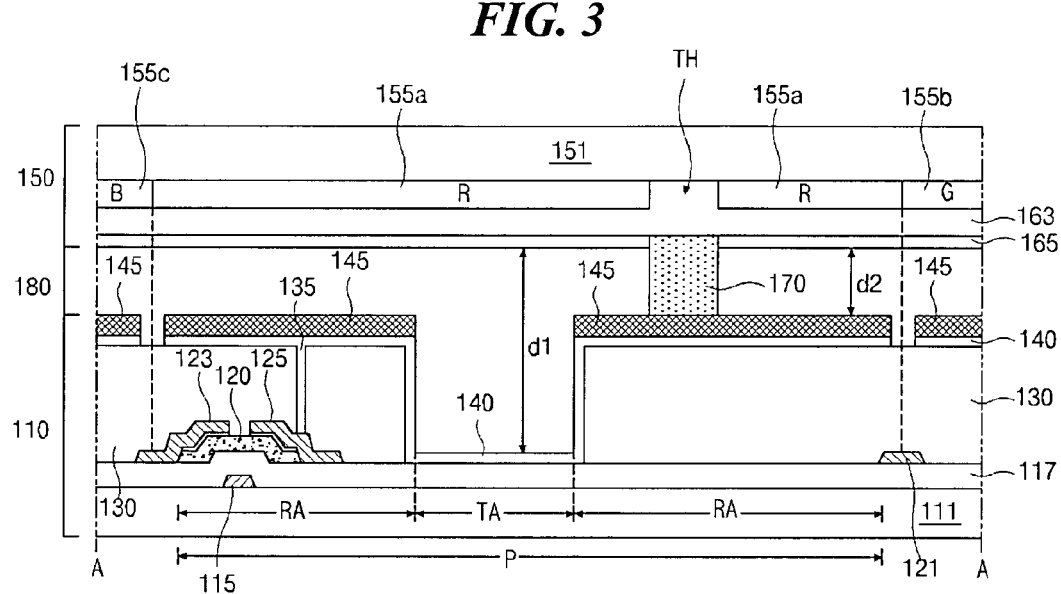
FIG. 3 is a cross sectional view taken along a line III-III of FIG. 2.
Figure 4:
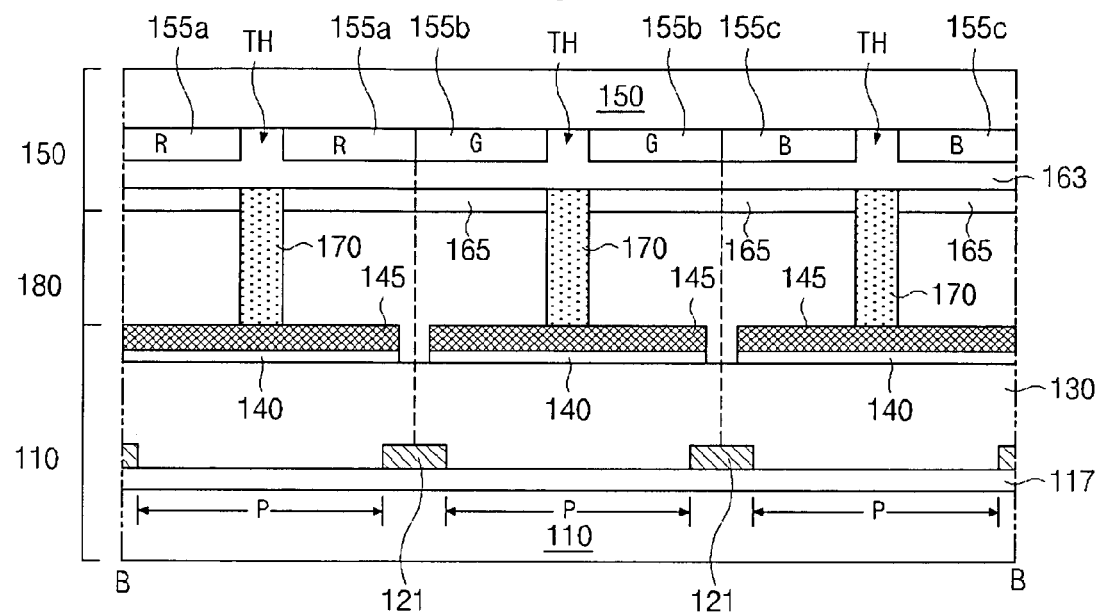
FIG. 4 is a cross sectional view taken along a line IV-IV of FIG. 2.

FIGS. 3 and 4 are cross sectional views taken along lines III-III and IV-IV of FIG. 2, respectively, and illustrate array elements of the transflective liquid crystal display device.

As shown in FIGS. 3 and 4, the transflective liquid crystal display device includes an array substrate 110, a color filter substrate 150, and a liquid crystal layer 180 interposed between the array and color filter substrates 110 and 150.

On the array substrate 110, the thin film transistor T includes the gate electrode 115, the semiconductor layer 120, the source electrode 123 and the drain electrode 125 on a transparent substrate 111 near the crossing of the gate line (reference 113 of FIG. 2) and a data line 121. A gate insulating layer 117 is interposed between the gate electrode 115 and the semiconductor layer 120 and contacts the transparent substrate 111. The source electrode 123 overlaps one end portion of the semiconductor layer 120, and the drain electrode 125 overlaps the other end portion of the semiconductor layer. Thus, the source and drain electrodes 123 and 125 face each other across the semiconductor layer 120. A passivation layer 130 is formed on the gate insulating layer 117 covering the thin film transistor T. The passivation layer 130 is formed of a low dielectric insulating material, for example, benzocyclobutene (BCB) or photo-acryl resin, and has a drain contact hole 135 exposing a portion of the drain electrode 125. In the present invention, the passivation layer 130 is formed only in the reflective area RA, not in the transmissive area TA. Thus, a cell gap between the array substrate 110 and the color filter substrate 150 is divided into two parts with different heights: a first cell gap "d1" and a second cell gap "d2" where the liquid crystal layer 180 is interposed. Namely, the first cell gap "d1" having a first height corresponds to the transmissive area TA, and the second cell gap "d2" having a second height corresponds to the reflective area RA. The first height is larger than the second height. The reason for forming the different heights between the reflective area RA and the transmissive area TA is to increase the light transmissivity in the transmissive mode.

It is also possible in the present invention that the passivation layer 130 is formed in the transmissive area TA, but it will have a smaller thickness than that in the reflective area RA. Additionally, it is also possible that the passivation layer 30 is formed over the entire gate insulating layer 117 with a uniform thickness, and thus the cell gap has the same height regardless of the reflective and transmissive areas RA and TA.

The pixel electrode 140 of the transparent conductive material is formed in the pixel region P contacting both the passivation layer 130 in the reflective area RA and the gate insulating area 117 in the transmissive area TA. The pixel electrode 140 also contacts the drain electrode 125 through the drain contact hole 135. As described with reference to FIG. 2, the pixel electrode 140 overlaps the edge portions of the gate line (reference 113 of FIG. 2) and the data line 121, such that the pixel electrode 140 is spaced apart form neighboring pixel electrodes of the neighboring pixel regions. Namely, the gaps between the neighboring pixel electrodes exist in a position over the gate and data lines. A reflector 145 is formed on the pixel electrode 135 only within the reflective area RA. An area where the reflector 145 is formed becomes the reflective area RA, and an area where the reflector 145 is not formed becomes the transmissive area TA. At this time, because the reflector 145 covers the thin film transistor T and the edge portions of the gate and data lines 113 and 121, the reflector 145 acts as a black matrix by preventing light leakage in the thin film transistor T.

In the color filter substrate 150 facing the array substrate 110, red (R), green (G) and blue (B) color filters 155a, 155b and 155c are also formed on a rear surface of a second transparent substrate 151. Each of the red (R), green (G) and blue (B) color filters 155a, 155b and 155c corresponds to a pixel region P, and has the through hole TH in the reflective area RA (or the reflector 145). An overcoat layer 163 is formed on a rear surface of the red (R), green (G) and blue (B) color filters 155a, 155b and 155c. The overcoat layer 163 protects the color filters 155a, 155b and 155c and planarizes their surfaces. Additionally, a common electrode 165 is formed on a rear surface of the overcoat layer 163. A column spacer 170 is formed on the overcoat layer 163 in position corresponding to the through hole TH. The size of the through hole TH is determined depending on how much brightness and color purity the transflective liquid crystal display device requires in the reflective mode to match the buyer's demands, because there is no color resin in the through hole TH. If the through hole TH has a larger size, the transflective liquid crystal display device will have an increased brightness and a decreased color purity in the reflective mode. On the contrary, if the through hole TH has a smaller size, the transflective liquid crystal display device will have a decreased brightness and a increased color purity in the reflective mode. Therefore, the brightness and the color purity are in an inverse relationship to each other. To meet the buyer's demands, the brightness and the color purity are determined by controlling the size of the through hole TH in the present invention.

Furthermore, it is important that the column spacer 170 is formed to correspond in position to the through hole TH. The column spacer 170 provides and maintains a space of a predetermined distance between the array substrate 110 and the color filter substrate 150.

Because the transflective liquid crystal display device of the present invention has to have a high resolution, a black matrix is not utilized. Further, because the liquid crystal display device of the present invention is transflective, the device includes the transmissive area TA and the reflective area RA in the pixel region P. In order to improve the brightness and color purity when the liquid crystal display device operates in the reflective mode, the through hole TH is formed in each color filter in the reflective area RA. Further, the column spacer 170 is formed corresponding in position to the through hole TH in order to enhance the efficiency of the pixel region P. In the present invention the column spacer 170 may be larger in area than the through hole TH. The column spacer 170 may be formed of one of benzocyclobutene (BCB), photo-acryl resin, cytop and perfluorocyclobutene (PFCB), so that the column spacer 170 does not reduce brightness in the reflective mode. Additionally, the spatial efficiency of the pixel region increases due to the fact that the column spacer 170 is disposed in a position corresponding to the through hole TH.

Figure 5:
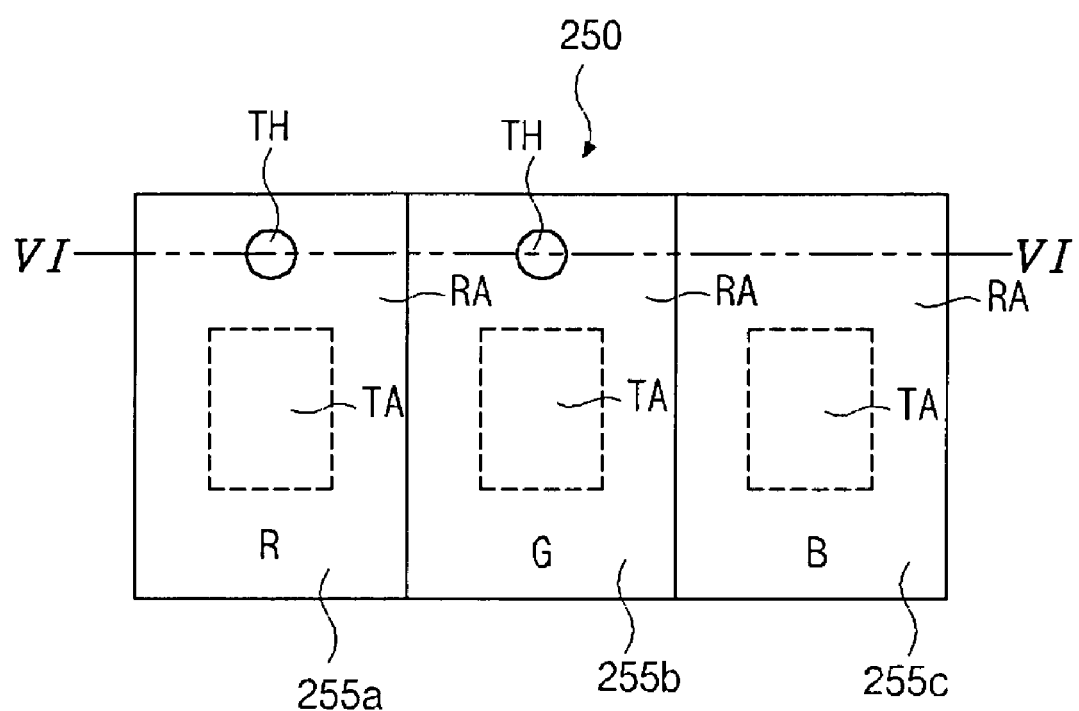
FIG. 5 is a schematic diagram illustrating a transflective liquid crystal display device having a high resolution according to a second embodiment of the present invention.

FIG. 5 is a schematic diagram illustrating a transflective liquid crystal display device having a high resolution according to a second embodiment of the present invention. In FIG. 5, array elements for the color filter substrate are only illustrated, and array elements for the array substrate are not illustrated because those elements are the same as in the first embodiment shown in FIG. 2.

In FIG. 5, color filters 255a, 255b and 255c are formed in the color filter substrate, and through holes TH are formed in the color filters 255a, 255b and 255c. The through holes TH may be can be formed in every color filters, or only formed in one or two of the color filters 255a, 255b and 255c. In the second embodiment shown in FIG. 5, the through holes TH are formed in two of the color filters, e.g., in the red (R) and green (G) color filters 255a and 255b. In such a configuration and structure, a column spacer (reference 270 of FIG. 6) is formed only in the blue (B) pixel region where the through hole TH is not formed. Namely, the column spacers are not formed in the red (R) and green (G) pixel regions such that the spaces do not correspond in position to the through holes TH as compared with the first embodiment.

Figure 6:
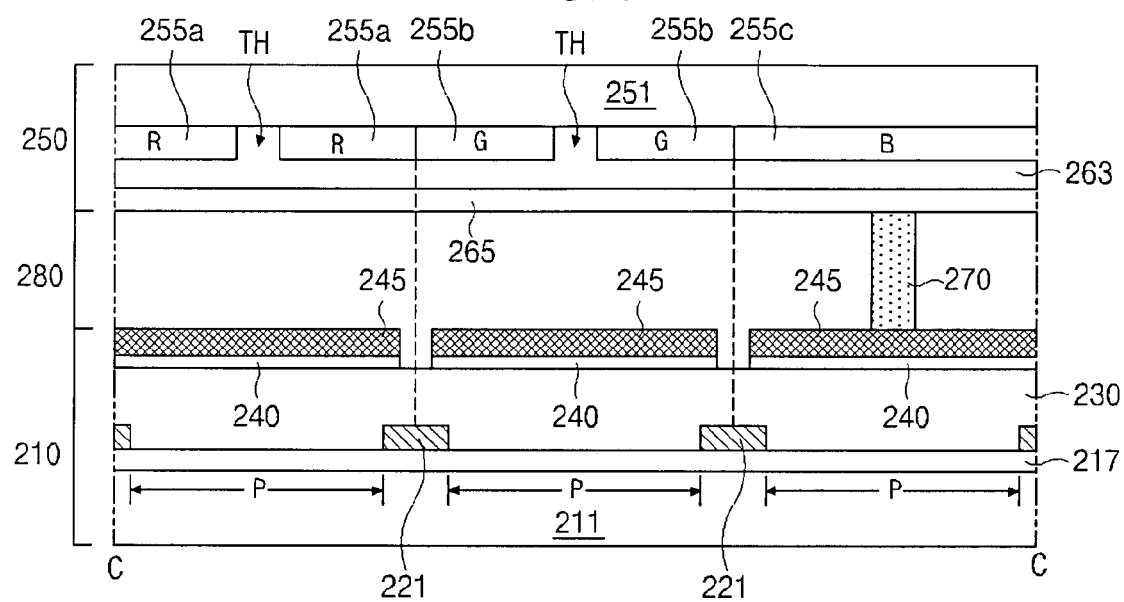
FIG. 6 is a cross sectional view taken along a line VI-VI of FIG. 5.

FIG. 6 is a cross sectional view taken along a line VI-VI of FIG. 5. An array substrate 210 and a color filter substrate 250 face each other, and a liquid crystal layer 280 is interposed between the array substrate 210 and the color filter substrate 250. Although FIG. 6 does not explicitly illustrate all elements of the array substrate 210, those elements are the same as in FIGS. 2-4. In FIG. 6, a gate insulating layer 217 is formed on a first transparent substrate 211, and data lines 221 are formed on the gate insulating layer 217. A passivation layer 230 is disposed on the gate insulating layer 217 to cover the data lines 221. Pixel electrodes 240 are disposed on the passivation layer 230 within the pixel regions P. A reflector 245 is formed on the pixel electrode 240 within each red (R), green (G) or blue (B) pixel region P. Although not shown in FIG. 6 but shown in FIG. 3, the passivation layer 230 may not exist in the transmissive area TA in order to double the cell gap in the reflective area RA rather than that in the transmissive are TA.

In the color filter substrate 250, red (R), green (G) and blue (B) color filters 255a, 255b and 255c are also formed on a rear surface of a second transparent substrate 251. Each of the red (R), green (G) and blue (B) color filters 155a, 155b and 155c corresponds to a pixel region P. Two of those three color filters, e.g., the red (R) and green (G) color filters, have through holes TH in a position corresponding to the reflective area (reference RA of FIG. 5). However, the blue (B) color filter does not have any through hole. An overcoat layer 263 is formed on a rear surface of the red (R), green (G) and blue (B) color filters 255a, 255b and 255c and functions to protect and planarize the surfaces of the color filters 255a, 255b and 255c. A common electrode 265 is formed on the whole rear surface of overcoat layer 263. In the blue (B) pixel region where the through hole is not formed, a column spacer 270 is formed between the array substrate 210 and the color filter substrate 250. The spacer 270 may be disposed in the reflective area RA corresponding to the reflector 245. If one of the red (R) and green (G) color filters 255a and 255b does not have the through hole TH, a column spacer 270 may be formed additionally in the red (R) or blue (B) pixel region P. Namely, the column spacer 270 may be only formed in the pixel region where the color filter does not have the through hole TH.

FIGS. 7A to 7E are cross sectional views illustrating the process steps of forming the color filter substrate of FIG. 4 according to the present invention.

Figure 7A:
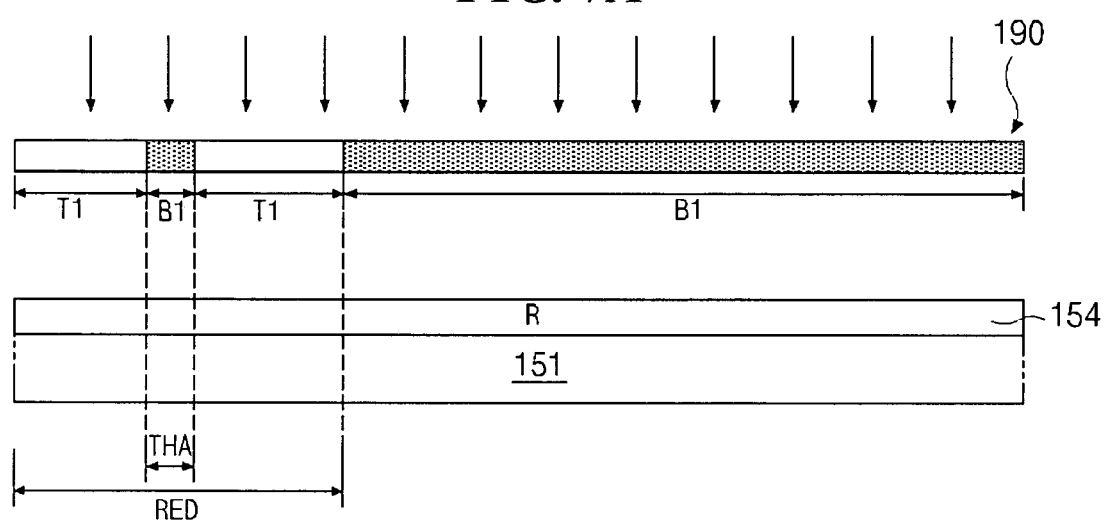
FIGS. 7A and 7E are cross sectional views illustrating process steps of forming the color filter substrate of FIG. 4 according to the present invention.

In FIG. 7A, a red (R) color resin 154 is formed on a transparent substrate 151 by a coating method. Thereafter, a mask 190 having light-transmitting portions T1 and light-shielding portions B1 is disposed over the red (R) color resin 154, and then a light exposure process is performed through the mask 190. If the red (R) color resin 154 is a negative type, portions of the red (R) color resin 154, which correspond to the light-transmitting portions T1 of the mask 190 and receive the light, remain during the developing process. The other portions of the red (R) color resin 154, which correspond to the light-shielding portions B1 of the mask 190, are removed during the developing process. Furthermore, a through hole area THA of the red (R) color resin 154, where the through hole (reference TH of FIGS. 2-4) is formed, is not exposed during the exposure process, and then it is removed during the developing process.

Figure 7B:
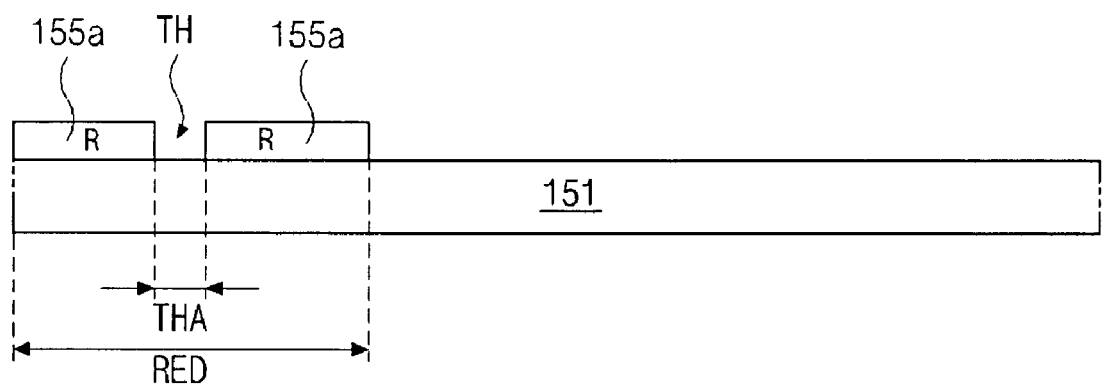

After the above-mentioned exposure and developing process using the mask 190, the red (R) color filter 155a remains with the through hole TH therein, as shown in FIG. 7B.

Figure 7C:
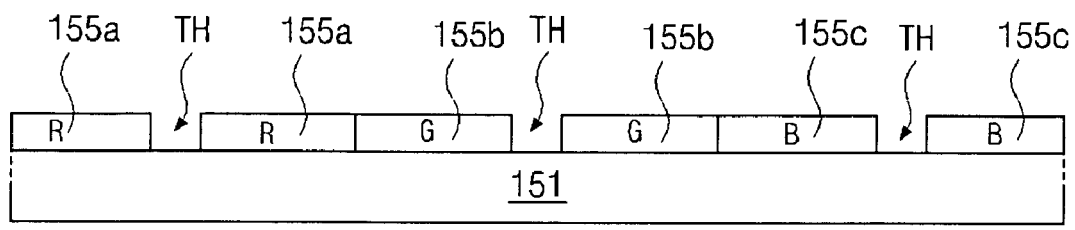

In the same manner described with reference to FIGS. 7A and 7B, the green (G) and blue (B) color filters 155b and 155c both having the through holes TH are finally formed on the transparent substrate 151, as shown in FIG. 7C. Although FIG. 7C shows that the through holes TH are formed in all color filters 155a, 155b and 155c, only one or two color filters may have the through hole TH in consideration of the color imaging characteristics. Furthermore, the through holes TH are formed in areas corresponding to the reflective area where the reflectors are formed in the array substrate. In the present invention, each through hole TH has a smaller size than the reflective area.

Figure 7D:
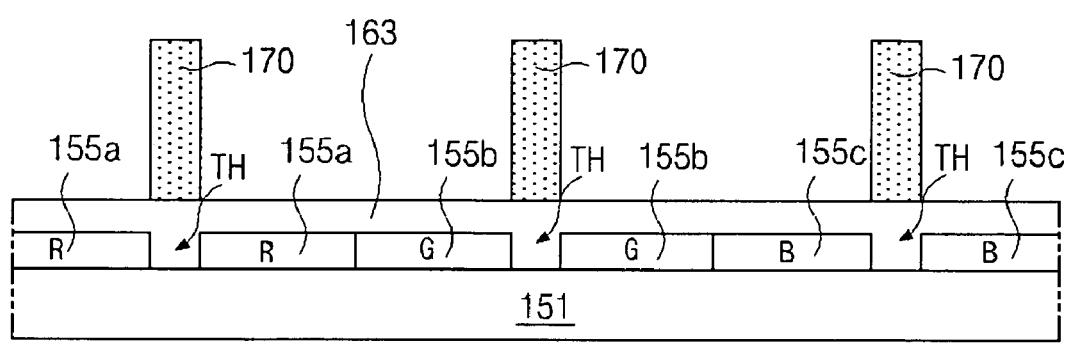

In FIG. 7D, the overcoat layer 163 is formed over the transparent substrate 151 to cover the red (R), green (G) and blue (B) color filters 155a, 155b and 155c. The overcoat layer 163 protects and planarizes the surfaces of those color filters 155a, 155b and 155c.

After forming the overcoat layer 163, a transparent organic material, e.g., benzocyclobutene (BCB), photo-acrylic resin, cytop, perfluorocyclobutene (PFCB), etc., is formed on the whole of the overcoat layer 163. Next, the transparent organic material is patterned so as to form the column spacers 170 in areas corresponding to the through hole TH of the color filer. Therefore, each color pixel has one column spacer 170. As previously discussed, the column spacers 170 make and maintain the cell gap between the color filter substrate and the array substrate when those substrates are attached to each other.

Although FIG. 7D shows that the column spacers 170 are formed at every through hole TH in every color pixel region, it is possible that the column spacer 170 may only be formed in one of the red (R), green (G) and blue (B) color pixel regions. Furthermore, if one or two of the color filters 155a, 155b and 155c does not have any through hole TH, the column spacers 170 may only be formed in the pixel region where the through hole does not exist.

Figure 7E:
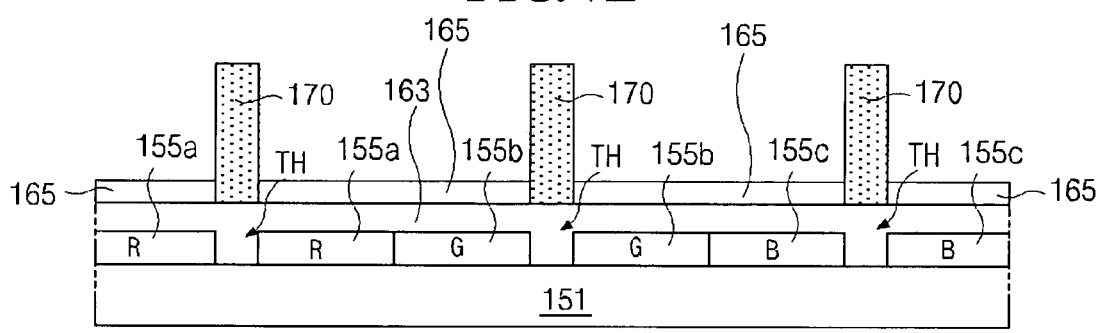

Next in FIG. 7E, a transparent conductive material, for example, Indium-Tin-Oxide (ITO) or Indium-Zinc-Oxide (IZO), is deposited on the entire exposed portions of the overcoat layer 163, thereby forming the common electrode 165. Therefore, the color filter substrate is finally complete.

According to the present invention, because the through holes are formed in the color filters, especially in positions corresponding to the reflective area, the transflective liquid crystal display device may have improved brightness and well-balanced color purity regardless of whether it is operated in the reflective or transmissive mode. Furthermore, because the black matrix is not formed in the color filter substrate, the manufacturing yield increases dramatically and the cost of production decreases. In the present invention, because the column spacer is formed in the reflective area corresponding to the through hole or in the pixel region where the through hole is not formed, there will be no limitation in designing and utilizing a reflective area in the transflective liquid crystal display device having high resolution. The transflective liquid crystal display device of the present invention may produce the images with high resolution and high brightness.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A method of forming a color filter substrate for use in a transflective liquid crystal display device, comprising:
    forming a color resin on a transparent substrate having reflective and transmissive potions;
    disposing a mask over the color resin;
    irradiating light to the color resin through the mask;
    forming color filters having through holes;
    forming an overcoat layer over the transparent substrate to cover the color filters;
    forming column spacers on the overcoat layer, wherein each column spacer corresponds in position to the through hole; and
    forming a common electrode on the overcoat layer exposed between the column spacers.

2. The method according to claim 1, wherein the through holes and the column spacers are in the reflective portion.

3. The method according to claim 1, wherein the column spacers includes one of benzocyclobutene (BCB), photo-acrylic resin, cytop and perfluorocyclobutene (PFCB).

* * * * *